US010560556B2

(12) United States Patent
Han et al.

(10) Patent No.: US 10,560,556 B2
(45) Date of Patent: Feb. 11, 2020

(54) MOBILE TERMINAL (71) Applicant: LG ELECTRONICS INC., Seoul (KR)

(72) Inventors: Jejun Han, Seoul (KR); Byoungchul Kim, Seoul (KR); Jaejun Jung, Seoul (KR); Junghong Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/324,781

(22) PCT Filed: Aug. 12, 2016

(86) PCT No.: PCT/KR2016/008943
§ 371 (c)(1),
(2) Date: Feb. 11, 2019

(87) PCT Pub. No.: WO2018/030563
PCT Pub. Date: Feb. 15, 2018

(65) Prior Publication Data
US 2019/0173983 A1 Jun. 6, 2019

(51) Int. Cl.
*H04M 1/02* (2006.01)
(52) U.S. Cl.
CPC .................. *H04M 1/0202* (2013.01)
(58) Field of Classification Search
CPC .... H04M 1/04; H04M 1/0214; H04M 1/0245; H04M 1/0258; H04M 2250/22; G06F 1/1624; G06F 1/1626; G06F 1/1681
See application file for complete search history.

(56) References Cited

U.S. PATENT DOCUMENTS

| 8,718,731 B1* | 5/2014 | Tang ............. H04M 1/185 206/305 |
| 2014/0225821 A1* | 8/2014 | Kim ............. H04M 1/236 345/156 |
| 2015/0097735 A1* | 4/2015 | Kim ............. H01Q 1/243 343/702 |
| 2016/0134730 A1 | 5/2016 | Lee et al. |
| 2017/0189957 A1* | 7/2017 | Dong ............. B22D 19/00 |
| 2018/0152550 A1* | 5/2018 | Dharmatilleke ..... H04B 1/3888 |

FOREIGN PATENT DOCUMENTS

| KR | 20130053472 | 5/2013 |
| KR | 101398141 | 5/2014 |
| KR | 20150009422 | 1/2015 |
| KR | 20150051959 | 5/2015 |

OTHER PUBLICATIONS

PCT International Application No. PCT/KR2016/008943, International Search Report dated May 11, 2017, 2 pages.

* cited by examiner

*Primary Examiner* — Nizar N Sivji
(74) *Attorney, Agent, or Firm* — Lee, Hong, Degerman, Kang & Waimey (57) ABSTRACT

The present invention relates to a mobile terminal comprising: a terminal body; a cover covering the terminal body and having a slit formed in one area thereof; and an elastic body provided on the slit and having both ends coupled to the cover adjacent to the slit. When an external force is applied to the cover, the elastic body is elastically deformed while being coupled to the cover.

11 Claims, 8 Drawing Sheets

MOBILE TERMINAL

CROSS-REFERENCE TO RELATED APPLICATIONS

This application is the National Stage filing under 35 U.S.C. 371 of International Application No. PCT/KR2016/008943, filed on Aug. 12, 2016, the contents of which are all hereby incorporated by reference herein in its entirety.

TECHNICAL FIELD

The present invention relates to a mobile terminal having an elastic member on a slit.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

Meanwhile, when a slit is formed on a rear cover of a mobile terminal, a crack may be generated on the rear cover if an impact is applied to a surrounding of the slit. This is also a problem caused because the slit is made of a rigid material.

DETAILED DESCRIPTION OF THE DISCLOSURE

The present invention is directed to solving the aforementioned problems and other drawbacks. Another aspect of the present invention is to provide a mobile terminal having an elastic body on a slit of a rear cover.

According to one aspect of the present invention, there is provided a mobile terminal, including a terminal body, a cover covering the terminal body and having a slit formed at one area thereof, and an elastic body provided on the slit and having both end portions coupled to covers adjacent to the slit, wherein the elastic body is elastically deformed while being coupled to the cover when an external force is applied to the cover.

According to one aspect of the present invention, the slit may be a space formed between first and second bonding surfaces which are formed by cutting the one area of the cover, spaced apart from each other by a predetermined gap due to the cutting, and disposed to face each other.

According to one aspect of the present invention, the slit may be provided with an elastic member, and the elastic member may be coupled to the first and second bonding surfaces by a polymer adhesive.

According to one aspect of the present invention, the elastic member may be thermoplastic polyurethane (TPU).

According to one aspect of the present invention, the first and second bonding surfaces may be subjected to a surface treatment, a polymer resin may be disposed on the surface-treated first and second bonding surfaces, and the elastic member may be coupled to the polymer resin.

According to one aspect of the present invention, the polymer resin may be polybutylene te-rephthate (PBT), and the elastic member may be thermoplastic polyurethane (TPU).

According to one aspect of the present invention, the elastic body may include first and second fixing members provided on an inner surface of the cover and coupled to both sides of the slit, first and second moving members moving in the first and second fixing members, respectively, and first and second springs provided between the first fixing member and the first moving member and between the second fixing member and the second moving member, respectively, to provide elastic forces to the first and second moving members.

According to one aspect of the present invention, the first and second moving members may be coupled to each other by a hinge.

According to one aspect of the present invention, a part of the first moving member or the second moving member may be exposed to outside through the slit in a first state in which an external force is not applied to the cover.

According to one aspect of the present invention, a near field communication (NFC) antenna may be disposed at a lower portion of the slit in a manner that at least part thereof overlaps an area of the slit.

According to one aspect of the present invention, the cover may be a rear cover covering a rear surface of the terminal body.

According to one aspect of the present invention, the first and second bonding surfaces may be chamfered to be inclined toward an inside.

According to one aspect of the present invention, the cover may be formed such that a portion where the first and second bonding surfaces are formed is thicker than other portions of the cover.

The slit may be formed at an inner area or an end portion of the cover.

Effect of the Disclosure

Hereinafter, effects of a mobile terminal according to the present invention will be described.

According to at least one of embodiments of the present invention, an elastic body can be disposed on a slit formed in a rear cover, thereby preventing a generation of a crack when an external impact or force is applied.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

BEST MODE OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
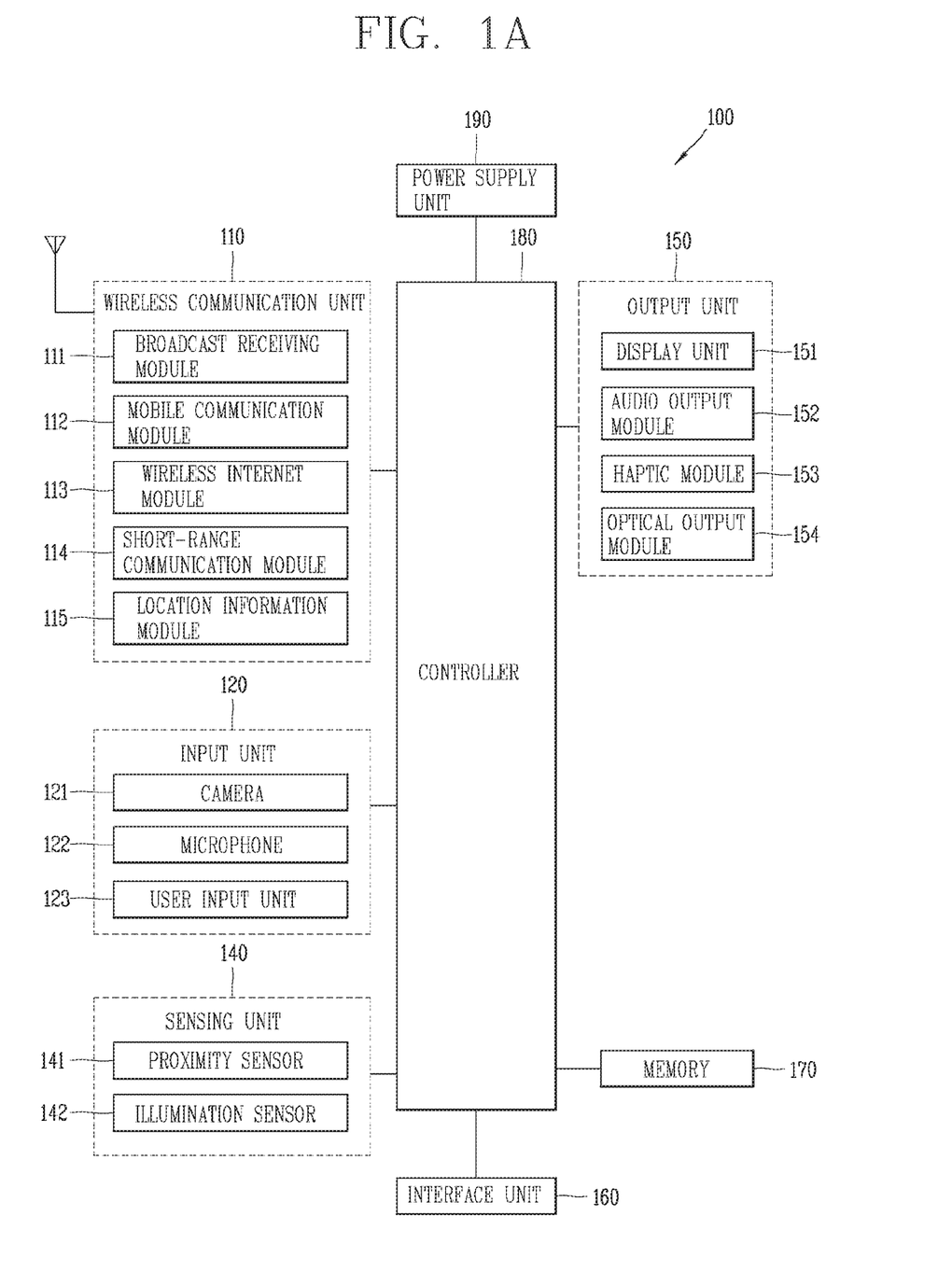
FIG. 1A is a block diagram of a mobile terminal in accordance with one exemplary embodiment of the present invention.
Figure 1B:
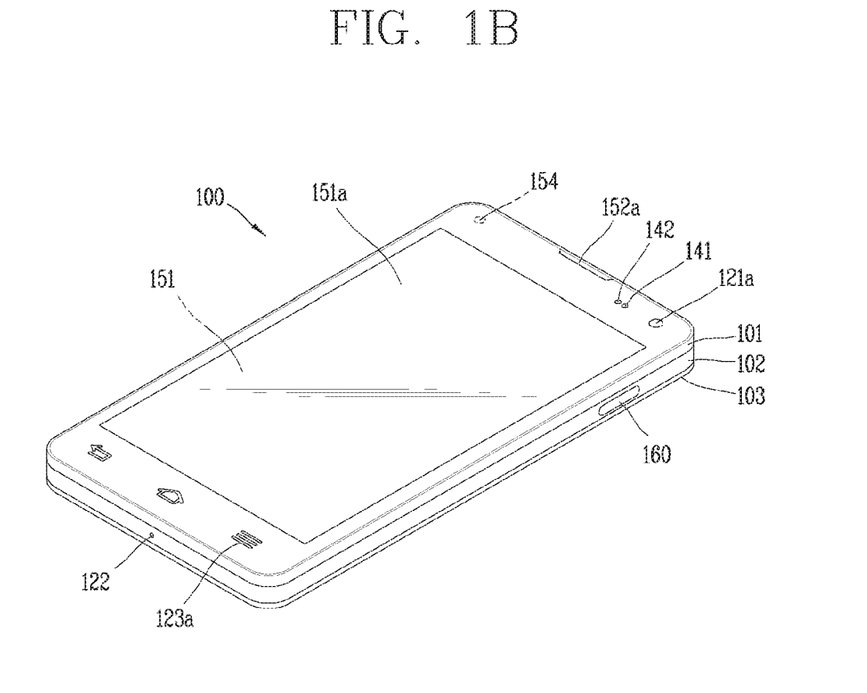
FIGS. 1B and 1C are conceptual views illustrating one example of a mobile terminal according to the present invention, viewed from different directions.
Figure 1C:
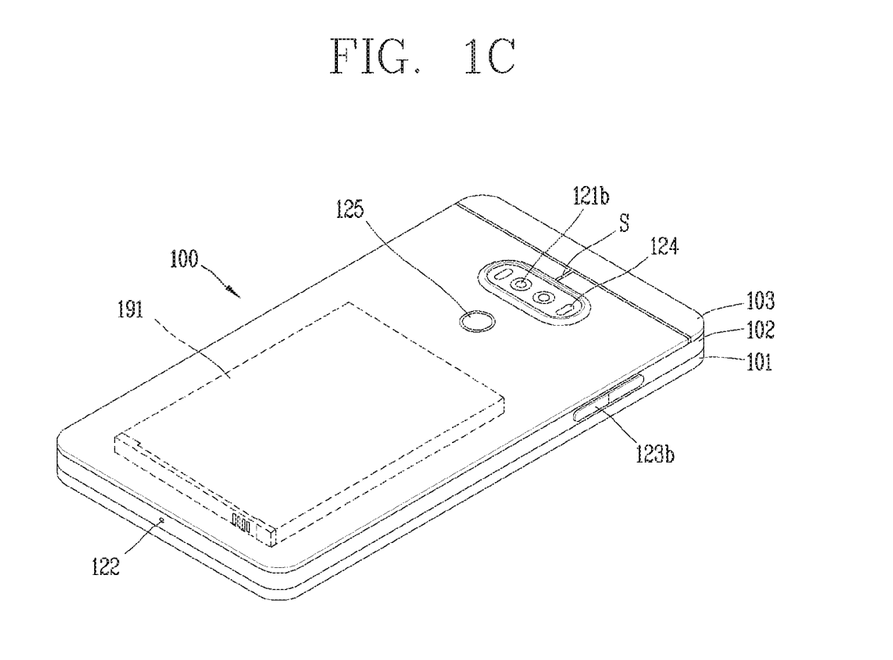

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner area of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors.

The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 10, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia reproduction request sounds.

The window 151a of the display unit 151 may include a sound hole for emitting sounds generated from the first audio output module 152a. However, the present invention is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

The present invention relates to a technique for preventing a mobile terminal 100 from being peeled off when an external force is applied to the mobile terminal 100, and more particularly, to preventing a generation of a crack when an external impact is applied to a rear cover 103 having a slit S. The rear cover 103 covers a battery of the mobile terminal 100 and thus may be referred to as a battery cover.

Figure 2A:
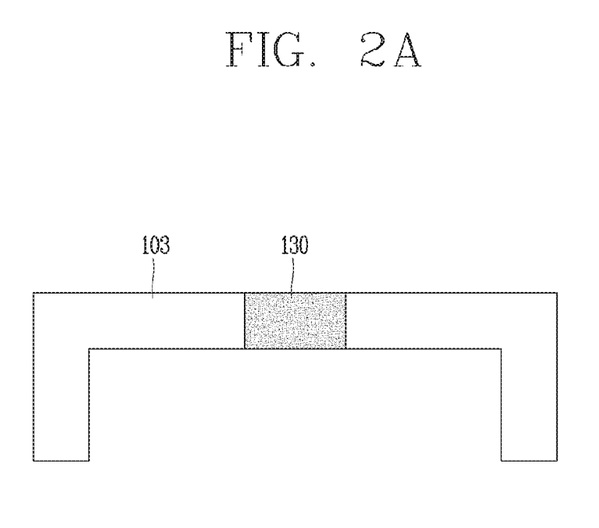
FIG. 2A is a view illustrating a state in which no external force is applied to a rear cover according to one embodiment of the present invention.
Figure 2B:
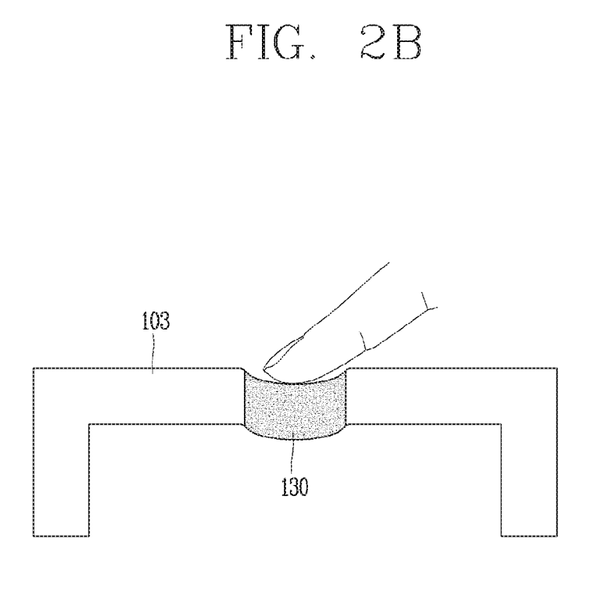
FIG. 2B is a schematic sectional view of the rear cover in a state in which an external force is applied in the state of FIG. 2A.

FIG. 2A is a schematic sectional view illustrating a rear cover 103 in accordance with one embodiment of the present invention, which illustrates a state in which no external force is applied, and FIG. 2B is a schematic sectional view of the rear cover 103 in a state in which an external force is applied in the state of FIG. 2A.

Hereinafter, a state in which no external force is applied to the rear cover 103 is referred to as a first state, and a state in which an external force is applied to the rear cover 103 is referred to as a second state. Also, the cover in the one embodiment of the present invention normally refers to the rear cover 103, but the present invention is not limited thereto. When a slit S is formed on a front case 101 of the mobile terminal, the front case 101 may correspond to this.

Figure 5A:
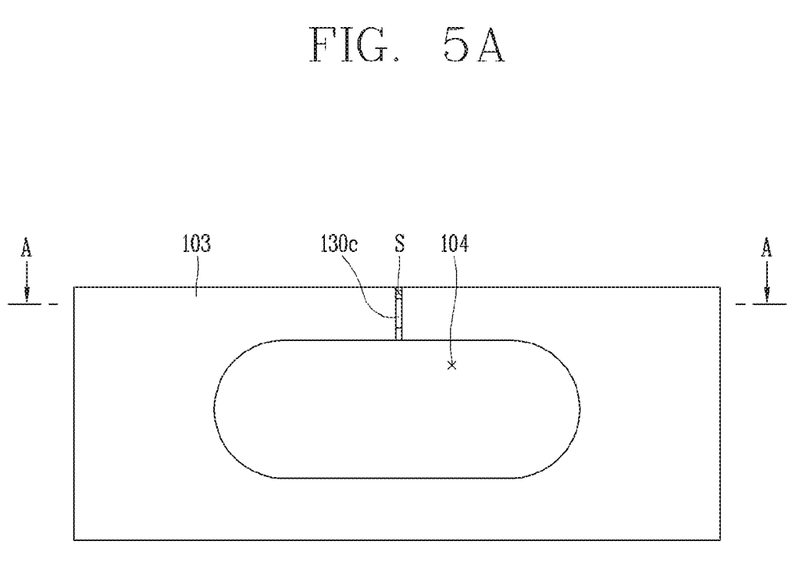
FIGS. 5A and 5B are status views of a rear cover in accordance with one embodiment of the present invention, viewed from front and rear sides.

In addition, the slit S may be formed at one area in the cover 103 as illustrated in FIG. 10, or on one end portion of the cover 103 as illustrated in FIG. 5A. At this time, the rear input unit 125 may be formed on the rear cover 103.

The rear cover 103 according to the one embodiment of the present invention is formed to cover an area where a near field communication (NFC) antenna (not shown) is disposed. The NFC antenna may be located on an upper side of the mobile terminal 100 and provided on the terminal body. For radiation of the NFC antenna, at least part of the rear cover 103 should be formed of a non-metallic member. And the radiation of the NFC antenna is performed to the area formed of the non-metallic member. The non-metallic member externally forms a slit S. When an external impact is applied to the slit S, a crack may be generated and an area of the slit S may be peeled off. At this time, the mobile terminal 100 includes the terminal body having such various electronic components, and a metal cover 103 covering the terminal body and having the slit S on one area thereof.

In order to solve such a problem, the mobile terminal 100 according to the one embodiment of the present invention, as illustrated in FIGS. 2A and 2B, is provided with an elastic body 130 disposed on the slit S and having both end portions coupled to covers 103a and 103b adjacent to the slit S. The cover 103 forms rear appearance of the mobile terminal 100.

The elastic body 130 is stretched when an external force is applied to the cover 103. The elastic body 130 is elastically deformed in the second state and connects both end portions of the slit S in a state where its length is increased. If the external force is removed, the elastic body 130 returns to the first state, and the length of the elastic body 130 is reduced.

The elastic body 130 is not particularly limited as long as it is a member or material that can be elastically deformed. At this time, when the rear cover 103 is made of a metallic material, it may cause a problem in coupling an elastic member 131 to the rear cover 103. This is because, when the elastic member 131 is made of a non-metallic member, the metal and the non-metal are coupled to each other.

Figure 3:
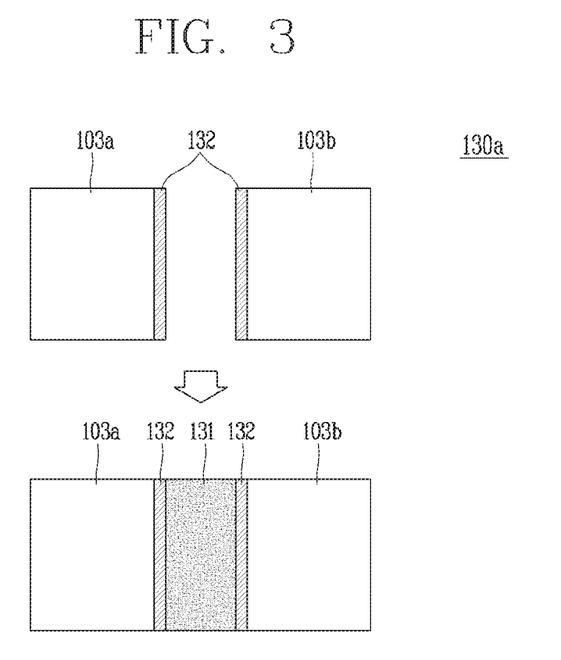
FIGS. 3 and 4 are views illustrating a fabrication process of an elastic body in accordance with one embodiment of the present invention.

To this end, in one embodiment of the present invention, as illustrated in FIG. 3, a polymer adhesive 132 may be applied to a bonding portion (connecting or joining portion) between the rear cover 103 and an elastic member 131 and the elastic member 131 may be formed in an insert-injection molding manner.

Figure 4:
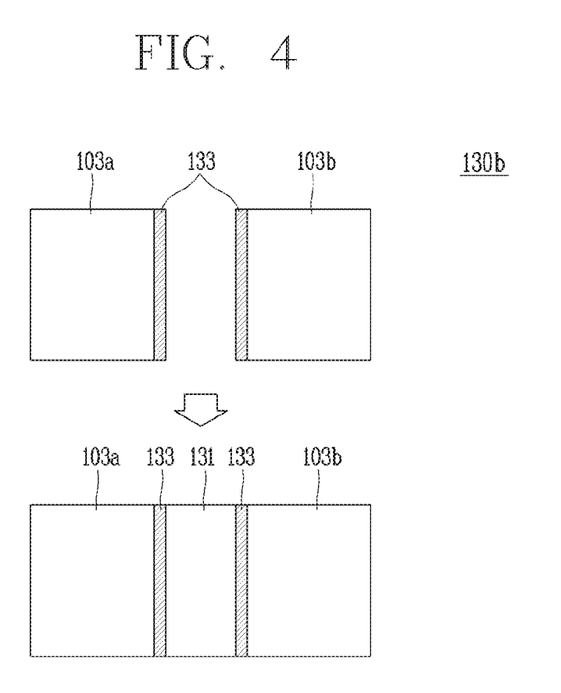

FIGS. 3 and 4 are views illustrating a fabrication process of an elastic body 130a, 130b according to one embodiment of the present invention. Hereinafter, description will be given with reference to FIGS. 3 and 4.

Referring to FIG. 3, the polymer adhesive 132 may be a polymer curable adhesive 132 and may be a primer. In the one embodiment of the present invention, thermoplastic polyurethane (TPU) is used as the elastic member 131 in the area of the slit. The TPU is a material capable of being elastically deformed and is merely illustrative. The elastic member 131 may be made of any material if it is a non-metallic material which can be coupled with a metal material and elastically deformed, unless otherwise specified. In other words, the thermoplastic polyurethane (TPU) is a representative resin to be elastically deformable among thermoplastic resins.

In this manner, the elastic deformation of the elastic body 130a prevents the cover 103 from being peeled off.

The elastic member 131 is formed on the slit S of the cover 103 by the polymer adhesive 132. The slit S, as illustrated in FIG. 10, may be formed along a lengthwise direction of the mobile terminal 100 or may alternatively be formed in a width direction.

Also, referring to FIG. 4, in order to fabricate the elastic body 130b, pores are formed on the bonding portion of the cover 103 to which the elastic member 131 is coupled in a manner such as corrosion or the like. When the pores are formed on a surface of the cover 103, a polymer resin 133 may be easily bonded to the cover 103. In one embodiment of the present invention, surface treatment is performed to form the pores on the bonding portion of the cover 103. The surface treatment is a type of corrosion treatment in which pores are formed on the bonding portion by pre-treating the bonding portion of the cover 103 made of the metal material. When the surface treatment is performed, a wedge structure is formed on the bonding portion, and the polymer resin 133 such as the thermoplastic polyurethane (TPU) can be easily coupled. The thermoplastic polyurethane (TPU) may be formed in an insert-injection molding manner. At this time, the bonding portion may be first and second bonding surfaces S1 and S2 to be described later.

The main purpose of the surface treatment is to make the first and second bonding surfaces S1 and S2 rough. For example, pores or wedges may be formed on the first and second bonding surfaces S1 and S2.

In one embodiment of the present invention, polybutylene te-rephthate (PBT), which is a rigid polymer resin, is firstly injected into the surface-treated metal cover 103, and then the thermoplastic polyurethane (TPU) may be secondarily injected on a molding surface of the PBT so as to form the TPU on the slit S.

At this time, since the PBT is a kind of polymer resin which is the same as the TPU, the PBT and the TPU can be easily bonded to each other, and also be easily coupled to the metal cover 103 by the pores or wedges formed on the bonding surfaces S1 and S2 of the cover 103.

Figure 5B:
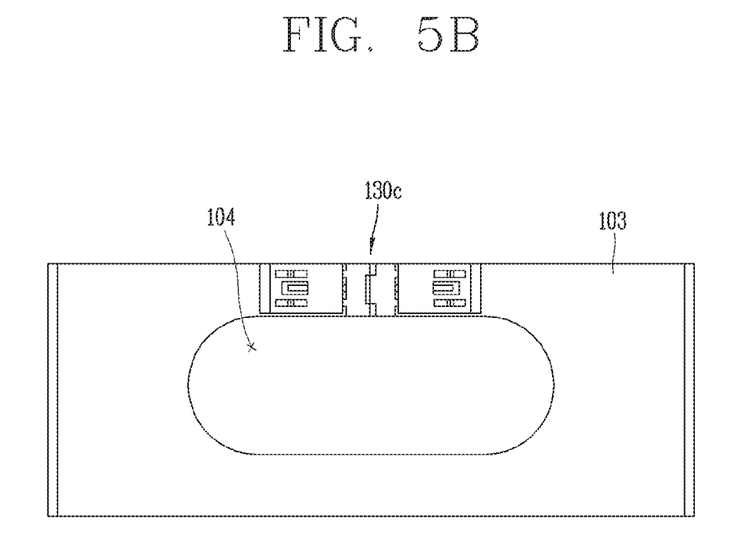
Figure 6:
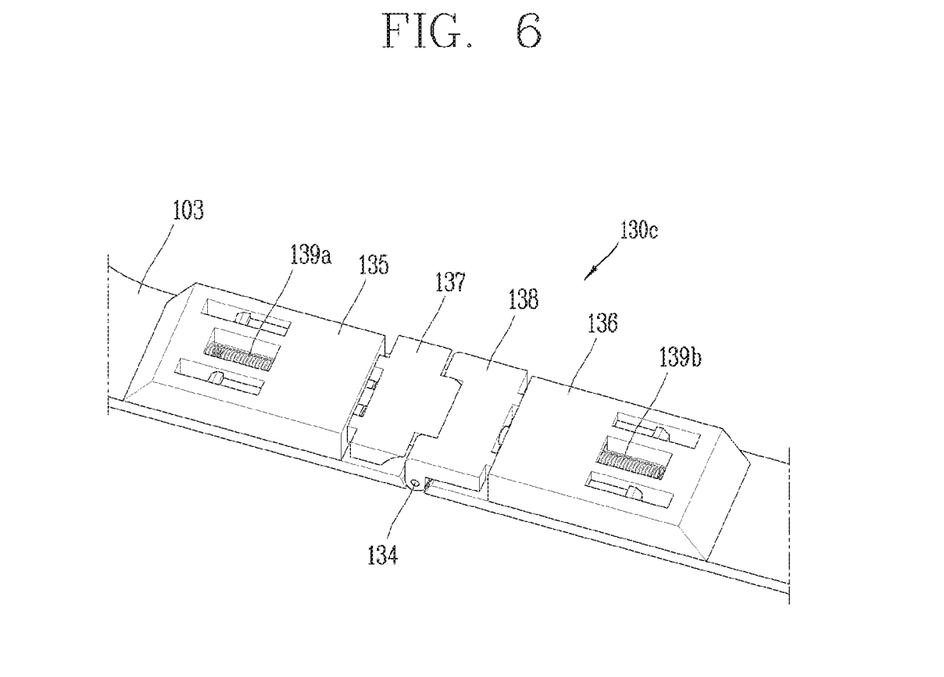
FIG. 6 is a perspective view in a state in which an elastic body illustrated in FIG. 5B is coupled to an inner surface of the rear cover.
Figure 7:
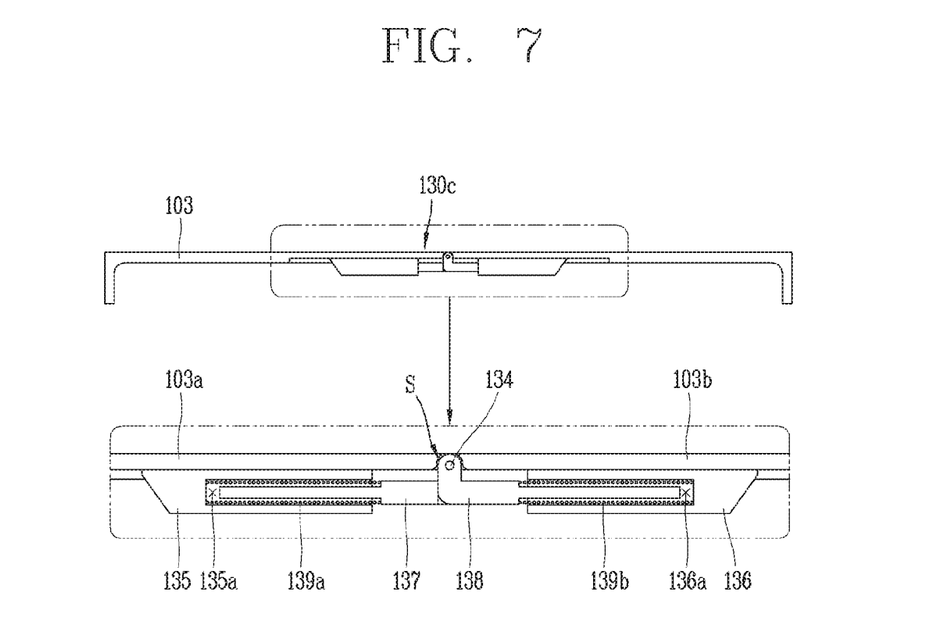
FIG. 7 is a sectional view taken along the line AA of FIG. 5A.

Meanwhile, in one embodiment of the present invention, an elastic body 130c may be provided on an inner surface of the cover 103, as illustrated in FIGS. 5A and 5B. FIGS. 5A and 5B are front and rear status views of the rear cover 103 in accordance with one embodiment of the present invention, FIG. 6 is a perspective view illustrating a state in which the elastic body 130c illustrated in FIG. 5B is coupled to the inner surface of the rear cover 103, and FIG. 7 is a sectional view taken along the line AA of FIG. 5A.

Referring to FIGS. 5A to 7, the elastic body 130c includes first and second fixing members 135 and 136, first and second moving members 137 and 138, and first and second springs 139a and 139b.

The first and second fixing members 135 and 136 are respectively coupled to a first cover 103a and a second cover 103b which are coupled to both sides of the slit S at the inner surface. The slit S is formed as the first and second covers 103a and 103b are spaced apart from each other.

The elastic body 130c includes first and second fixing members 135 and 136, first and second moving members 137 and 138 that linearly reciprocate on the first and second fixing members 135 and 136, respectively, and first and second springs 139a and 139b provided between the first fixing member and the first moving member 137 and between the second fixing member 136 and the second moving member 138, respectively, to provide elastic forces to the first and second moving members 127 and 138. The first fixing member 135, the first moving member 137 and the first spring 139a and the second fixing member 136, the second moving member 138 and the second spring 139b are disposed at positions facing each other, respectively, with respect to a center of the slit S. A hinge 134 is disposed at the center of the slit S in an overlapping manner.

The first and second fixing members 135 and 136 have empty inner spaces 135a and 136a, in which the first and second moving members 137 and 138 are disposed to be movable, respectively. The inner spaces 135a and 136a may be guides for guiding the movement of the first and second moving members 137 and 138.

The first and second moving members 137 and 138 may rotate centering on the same axis. At this time, the hinge 134 is formed on the axis. The first and second moving members 137 and 138 are coupled to the hinge 134, and the first and second springs 139a and 139b linearly reciprocate the first and second moving members 137 and 138, respectively.

On the other hand, in the first state in which no external force is applied to the surrounding of the slit area, a part of the first moving member 137 or the second moving member 138 is exposed to the outside through the slit S. To this end, at least one of the first moving member 137 and the second moving member 138 may protrude more toward the slit S. FIG. 7 illustrates that one end portion of the second moving member 138 protrudes outward. At this time, the protruded portion should not protrude more than the cover 103 in the first state.

At this time, one side of the elastic body 130 is provided with a through hole 104 so that a rear camera 121b and the like are provided therein.

Figure 8:
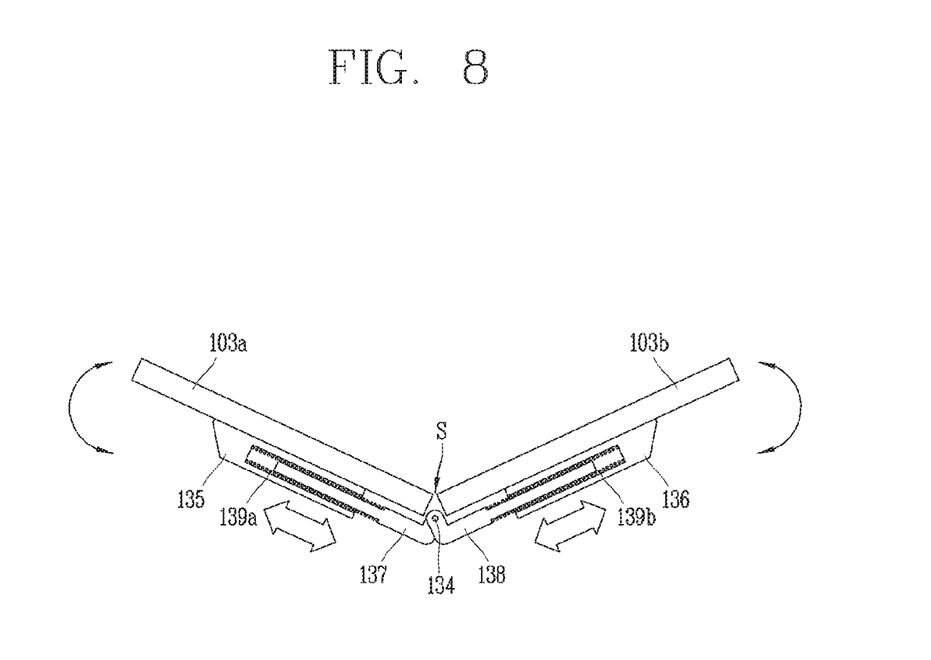
FIG. 8 is a view illustrating a shape of the rear cover when an external force is applied in FIG. 7.

FIG. 8 is an exaggerated view of the shape of the rear cover 103 when an external force is applied in FIG. 7. That is, FIG. 7 is a sectional view in the first state where no external force is applied to the rear cover 103, and FIG. 8 is a sectional view in the second state where an external force is applied to the rear cover 103.

As illustrated in FIG. 7, the first and second springs 139a and 139b are in a contracted state to supply elastic forces to the first and second moving members 137 and 138, respectively. In the first state, the first spring 139a is pushing the first moving member 137 toward the first fixing member 135, and the second spring 139b is pushing the second moving member 138 toward the second fixing member 136.

In the second state, the first and second springs 139a and 139b are more relaxed than in the first state. This is because the first and second moving members 137 and 138 have been moved linearly by predetermined distances.

The first moving member 137 is movable along the guide 135a formed inside the first fixing member 135, and the second moving member 138 is movable along the guide 136a inside the second fixing member 136. At this time, the first and second moving members 137 and 138 are formed stepped to have different thicknesses and diameters from each other in a lengthwise direction so that the first and second springs 139a and 139b are engaged with the first and second moving members 137 and 138, respectively.

The slit S in the one embodiment of the present invention, as aforementioned, may be formed in the lengthwise direction or the width direction of the rear cover 103, and indicates a partially-cut portion of the rear cover 103. At this time, the cut portion forms the first bonding surface S1 and the second bonding surface S2. Hereinafter, this will be described with reference to FIG. 9.

Figure 9:
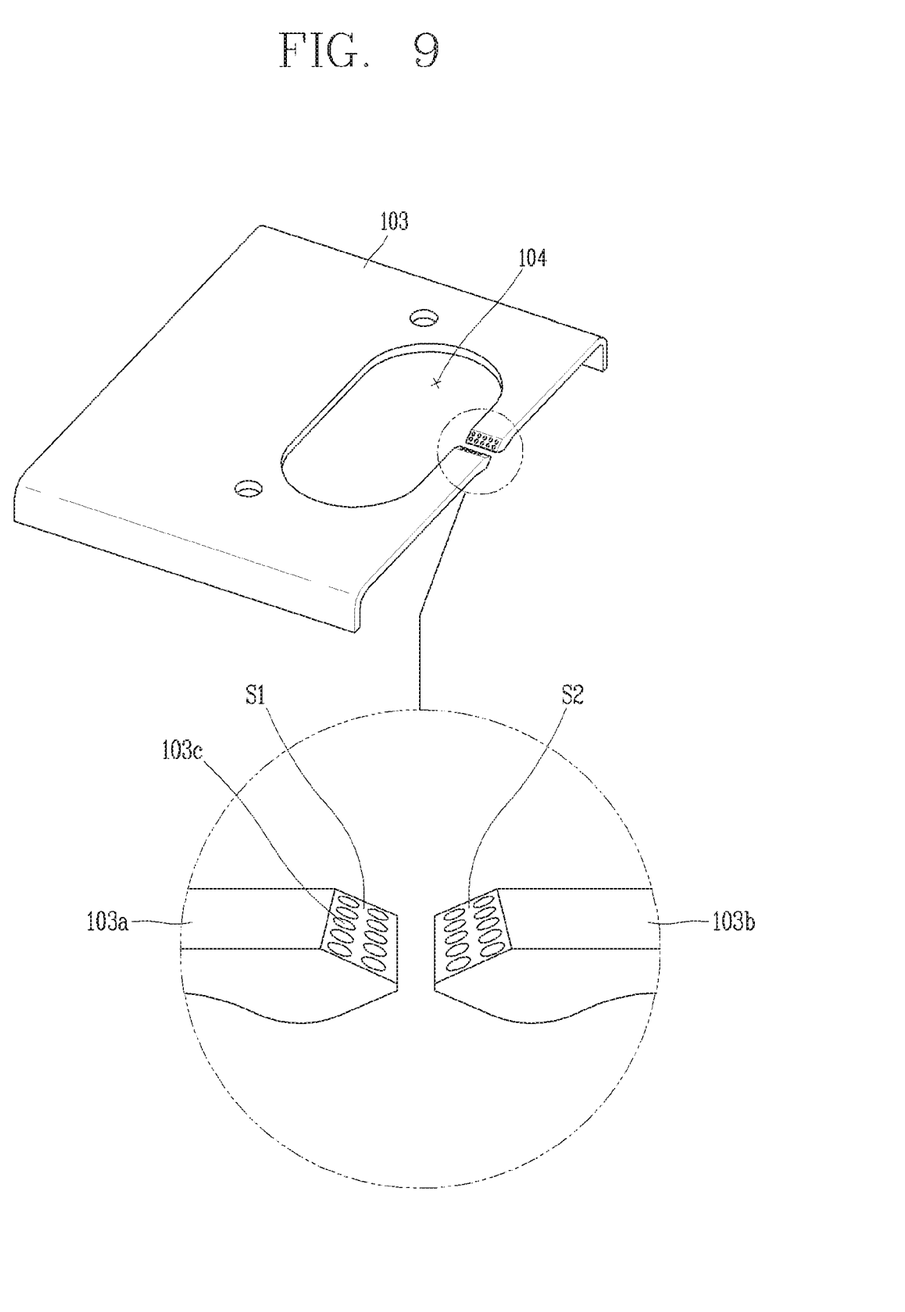
FIG. 9 is a partial perspective view and a partial enlarged view of a rear cover in accordance with one embodiment of the present invention, viewed from the rear side.

FIG. 9 is a partial perspective view and a partial enlarged view of the rear cover 103 according to one embodiment of the present invention, viewed from the rear side. The first bonding surface S1 and the second bonding surface S2 of the rear cover 103 may be inclined and have pores 103c thereon. The elastic body 130 is disposed in a space between the first and second bonding surfaces S1 and S2. As such, the slit S is formed by the first and second bonding surfaces S1 and S2, and the first and second bonding surfaces S1 and S2 are formed at positions facing each other with being spaced apart from each other. In other words, the slit S indicates a portion that one area of the cover 103 has been removed.

The pores 103c may be holes or grooves formed by a laser and the first and second bonding surfaces S1 and S2 may be chamfered to ensure adhesion, tensile strength and shear strength of the polymer adhesive 132 and the elastic member 131. That is, the first and second bonding surfaces S1 and S2 are formed to be inclined toward the inside of the cover 103.

At this time, for the chamfering, the thicknesses of the first and second bonding surfaces S1 and S2 may be larger than other portions of the cover 103.

On the other hand, although not illustrated in detail, during the fabricating process as illustrated in FIG. 3, the insert-injection molding is performed after the polymer adhesive 132 is applied or coated on the first and second bonding surfaces S1 and S2. During the insert-injection molding, the polymer adhesive 132 is re-melted together with the elastic member 131 and then re-cured, thereby forming a polymer-entangled bonding structure.

As described above, in one embodiment of the present invention, when an external force is applied to a surrounding of the slit S, a cover can be elastically deformed without being peeled off.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

INDUSTRIAL AVAILABILITY

Embodiments of the present invention can be applied to a mobile terminal in which a slit is formed on a cover.

The invention claimed is:
1. A mobile terminal, comprising:
a terminal body;
a cover covering the terminal body and having a slit formed at one area thereof; and
an elastic body provided on the slit and having both end portions coupled to covers adjacent to the slit,
wherein the elastic body is elastically deformed while being coupled to the cover when an external force is applied to the cover,
wherein the slit is a space formed between first and second bonding surfaces which are formed by cutting the one area of the cover, spaced apart from each other by a predetermined gap due to the cutting, and disposed to face each other,
wherein the slit is provided with an elastic member, and the elastic member is coupled to the first and second bonding surfaces by a polymer adhesive, and
wherein the first and second bonding surfaces are subjected to a surface treatment, a polymer resin is disposed on the surface-treated first and second bonding surfaces, and the elastic member is coupled to the polymer resin.

2. The terminal of claim 1, wherein the elastic member is thermoplastic polyurethane (TPU).

3. The terminal of claim 1, wherein the polymer resin is polybutylene te-rephthate (PBT), and the elastic member is thermoplastic polyurethane (TPU).

4. The terminal of claim 1, wherein the elastic body comprises:
 first and second fixing members provided on an inner surface of the cover and coupled to both sides of the slit;
 first and second moving members moving in the first and second fixing members, respectively; and
 first and second springs provided between the first fixing member and the first moving member and between the second fixing member and the second moving member, respectively, to provide elastic forces to the first and second moving members.

5. The terminal of claim 4, wherein the first and second moving members are coupled to each other by a hinge.

6. The terminal of claim 5, wherein a part of the first moving member or the second moving member is exposed to outside through the slit in a first state in which an external force is not applied to the cover.

7. The terminal of claim 1, wherein a near field communication (NFC) antenna is disposed at a lower portion of the slit in a manner that at least part thereof overlaps an area of the slit.

8. The terminal of claim 1, wherein the cover is a rear cover covering a rear surface of the terminal body.

9. The terminal of claim 1, wherein the first and second bonding surfaces are chamfered.

10. The terminal of claim 9, wherein the cover is formed such that a portion where the first and second bonding surfaces are formed is thicker than other portions of the cover.

11. The terminal of claim 1, wherein the slit is formed at an inner area or an end portion of the cover.

* * * * *